(12) United States Patent
Hammes

(10) Patent No.: US 9,986,671 B1
(45) Date of Patent: Jun. 5, 2018

(54) NON-CLOGGING COULTER ASSEMBLY

(71) Applicant: AgSynergy, L.L.C., Seneca, KS (US)

(72) Inventor: Ryan J. Hammes, Seneca, KS (US)

(73) Assignee: AgSynergy, L.L.C., Seneca, KS (US)

( * ) Notice: Subject to any disclaimer, the term of this patent is extended or adjusted under 35 U.S.C. 154(b) by 0 days. days.

(21) Appl. No.: 15/680,587

(22) Filed: Aug. 18, 2017

Related U.S. Application Data

(63) Continuation-in-part of application No. 14/960,959, filed on Dec. 7, 2015.

(51) Int. Cl.
| | | |
|---|---|---|
| *A01B 15/18* | (2006.01) | |
| *A01B 17/00* | (2006.01) | |
| *A01B 5/08* | (2006.01) | |
| *A01C 5/06* | (2006.01) | |
| *A01C 7/00* | (2006.01) | |
| *A01C 7/06* | (2006.01) | |

(52) U.S. Cl.
CPC ............... *A01B 5/08* (2013.01); *A01B 15/18* (2013.01); *A01B 17/002* (2013.01); *A01C 5/064* (2013.01); *A01C 7/006* (2013.01); *A01C 7/06* (2013.01)

(58) Field of Classification Search
CPC ....... A01B 15/18; A01B 15/00; A01B 17/002; A01B 17/00; A01C 5/08; A01B 5/04; A01B 5/00; A01C 5/064; A01C 5/062; A01C 5/06; A01C 5/00; A01C 7/006; A01C 7/00; A01C 7/06
See application file for complete search history.

(56) References Cited

U.S. PATENT DOCUMENTS

| | | |
|---|---|---|
| 197,204 A | 11/1877 | Concannon et al. |
| 709,741 A | 9/1902 | Burrill |
| 1,062,069 A | 5/1913 | Wicksteed |
| 2,391,910 A | 1/1946 | Lutes |
| 2,912,944 A | 11/1959 | Snow et al. |
| 4,273,057 A | 6/1981 | Pollard |
| 4,656,957 A | 4/1987 | Williamson et al. |
| 4,716,971 A | 1/1988 | Lanham |
| 4,723,495 A | 2/1988 | Dietrich, Sr. et al. |
| 5,626,196 A | 5/1997 | Hughes |
| 7,481,171 B2 | 1/2009 | Martin |
| 8,453,755 B2 | 6/2013 | Renyer et al. |
| 8,813,865 B2 | 8/2014 | Renyer et al. |
| 2010/0282480 A1 | 11/2010 | Breker et al. |
| 2012/0048160 A1 | 3/2012 | Adams et al. |
| 2014/0238283 A1 | 8/2014 | Wendte et al. |
| 2016/0165789 A1 | 6/2016 | Gervais et al. |

OTHER PUBLICATIONS

Agronomics Row Crops Cultivator Components, available online at http://www.sare.org/publications/steel/pg26.htm. Date Accessed: Dec. 29, 2010.
Office Action in U.S. Appl. No. 14/960,959, filed Dec. 7, 2015.

*Primary Examiner* — Christopher J. Novosad
(74) *Attorney, Agent, or Firm* — Hovey Williams LLP

(57) ABSTRACT

An improved coulter assembly (10) includes a rotatable coulter blade (12) and a supporting assembly (14) having a parallel linkage arm assembly (34) and an active piston and cylinder assembly (58). The assembly (14) serves to maintain the blade (12) at a depth of at least about four inches, in order to prevent clogging of the assembly (10) during use. Another coulter assembly (110) includes a knife adjustment assembly (122) allowing selective vertical and angular adjustment of the knife (116) relative to the coulter blade (112).

16 Claims, 6 Drawing Sheets

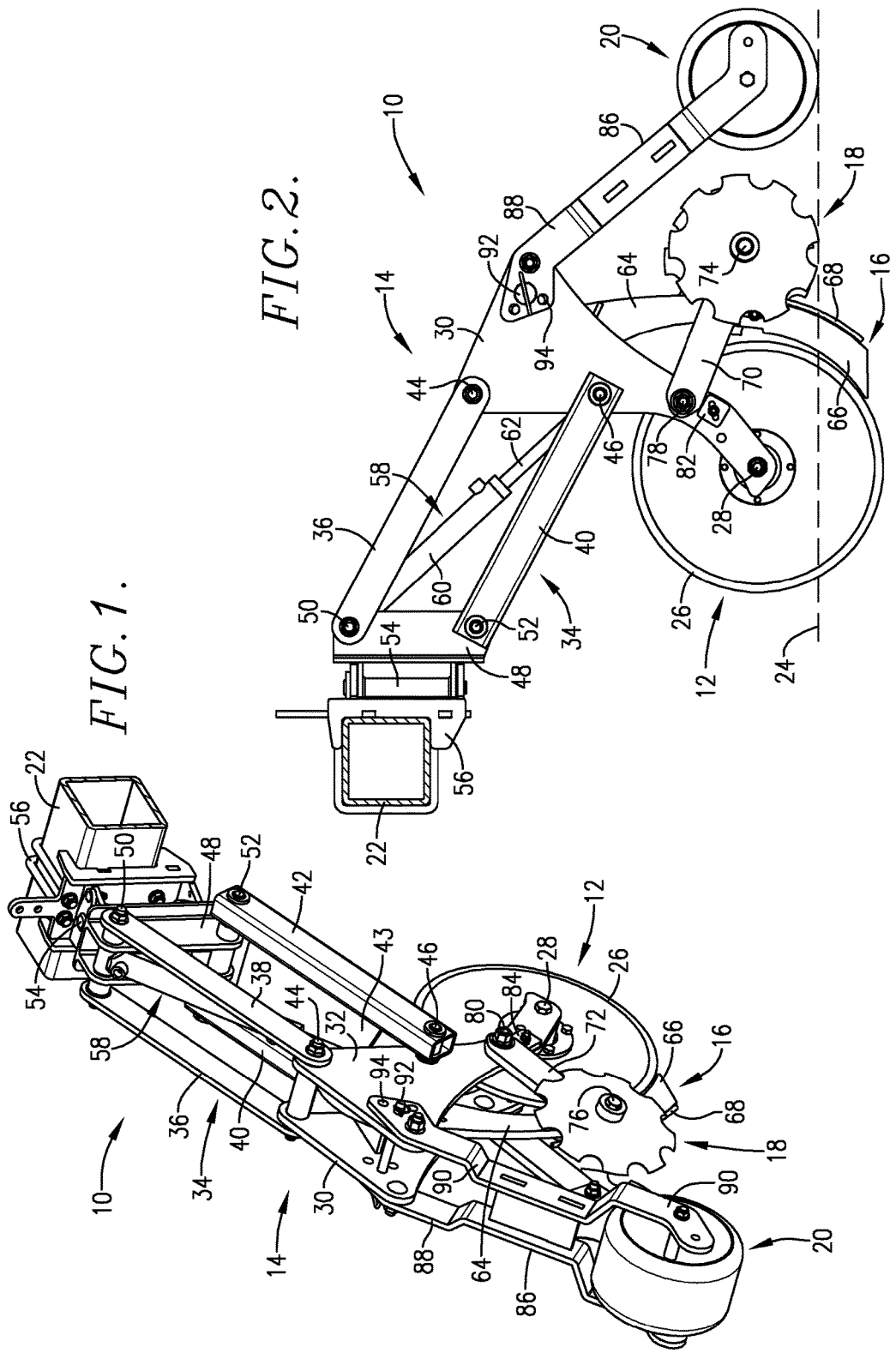

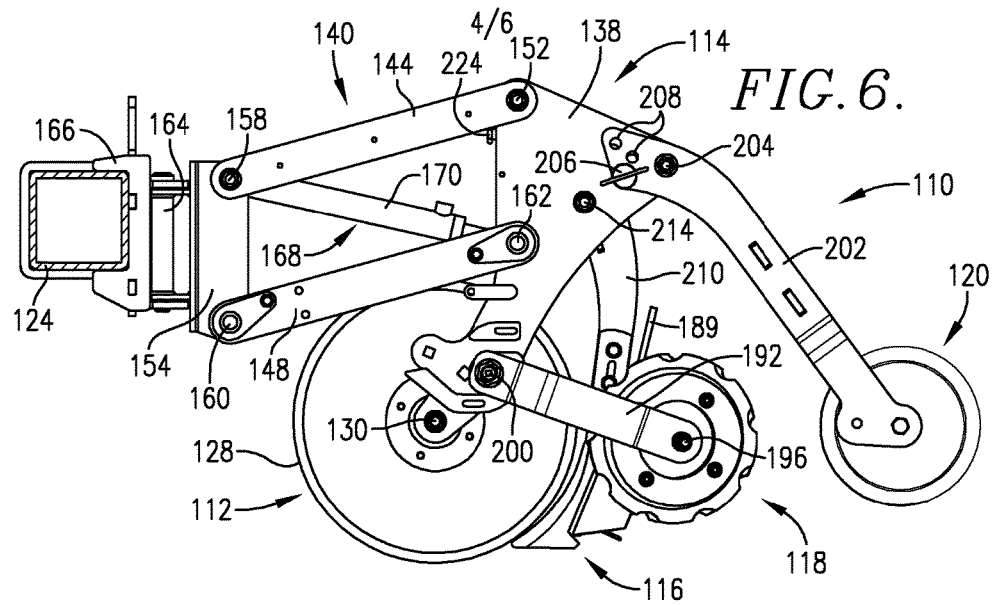
FIG. 6.
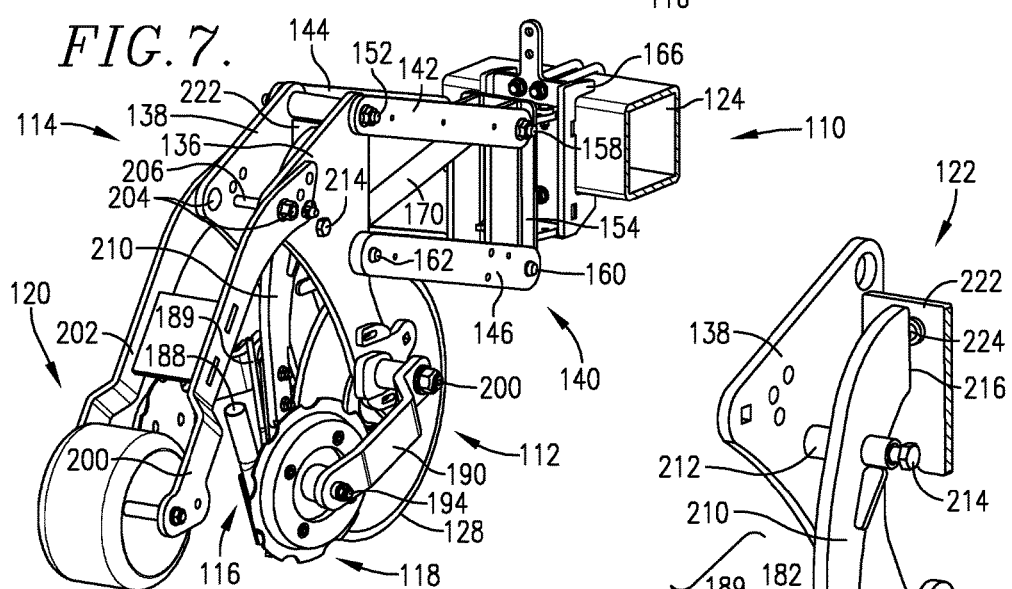
FIG. 7.
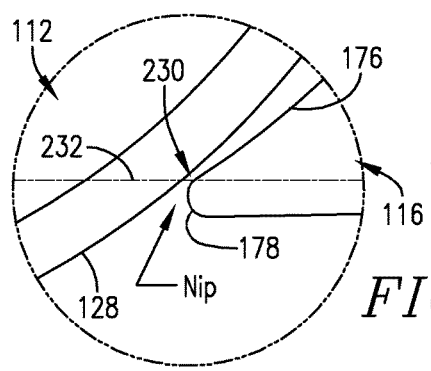
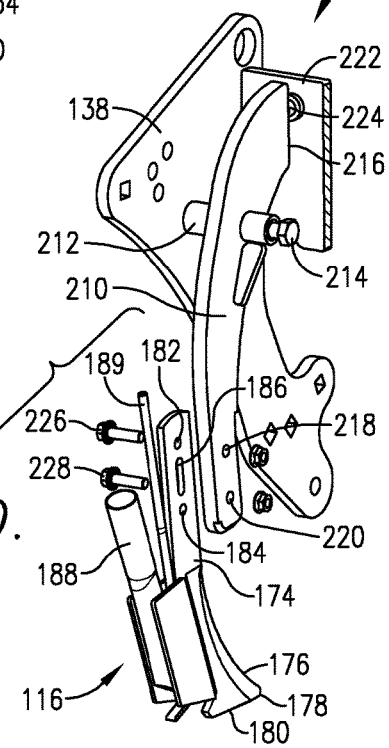
FIG. 10.
FIG. 12A.

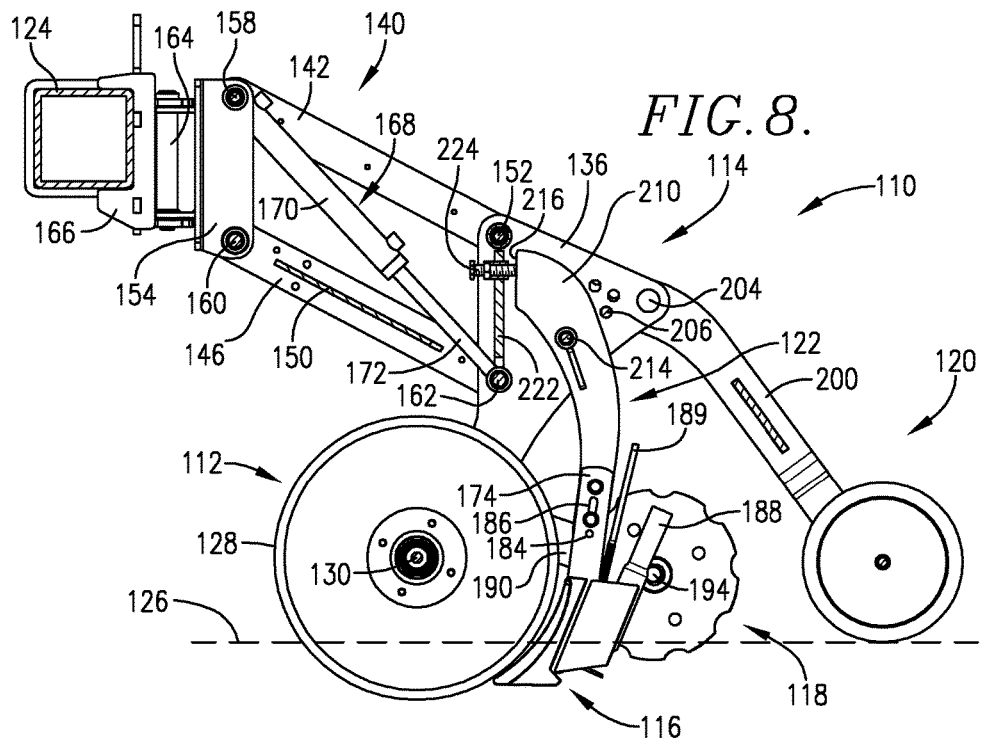
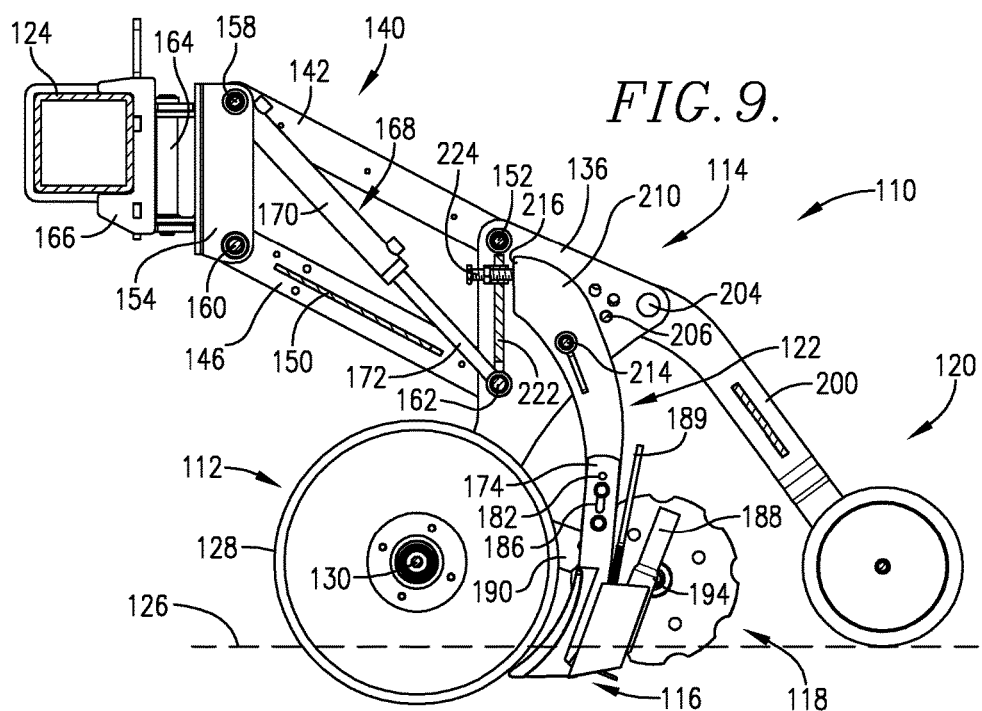

NON-CLOGGING COULTER ASSEMBLY

CROSS-REFERENCE TO RELATED APPLICATION

This is a continuation-in-part application of identically titled application Ser. No. 14/960,959 filed Dec. 7, 2015, which is incorporated herein by reference in its entirety.

BACKGROUND OF THE INVENTION

Field of the Invention

The present invention is broadly concerned with improved tillage or fertilizer application implements used in agricultural applications. More particularly, the invention is concerned with coulter assemblies which are designed to minimize or eliminate clogging of the assemblies as they traverse the earth.

Description of the Prior Art

A variety of farm implements have been provided in the past for seed planting or incorporation of various liquid preparations and/or other products into the soil. Generally, these implements include a plurality of rotatably mounted, disk-shaped coulter blades, which form slits or trenches in the soil as the implement is pulled through a field. In fertilizer or seeding applications, each coulter blade is typically trailed by a shoe or knife supporting a tube through which liquid fertilizer, seeds, or the like is incorporated into the soil. An implement of this character is described in U.S. Pat. No. 4,656,957. Other background references include U.S. Pat. Nos. 197,204, 709,741, 1,062,169, 2,391,910, 2,912,944, 5,626,196, 7,481,171, 8,813,865, 8,453,755, US Patent Application Publication No. 2010/0282,480 and non-patent literature article entitled "Agronomic Row Crops-Cultivator Components," found on-line at http://www.sare.org/publications/steel/pg26.htm, (Date Accessed Dec. 29, 2010). See also, the following websites:
   http://www.yetterco.com/
      products?catId=133&productId=11;
   http://www.yetterco.com/
      products?catId=133&productId=173; and
   http://www.kongskilde.com/us/en-US/Agriculture/Soil/
      Fertilising %20technique/
      Accessories%20for%20toolbars%20and%20
      Applicators/Row%20Pro%20300%2
      0-%20Parallel%20Linkage%20-
      %20Standard%20Row%20Unit (without spaces).

A consistent problem with many prior coulter assemblies is the tendency of the units to clog, particularly in the constricted area between the blade and the trailing knife or shoe. In some instances, the clogging problem can be so serious as to substantially impede tillage or fertilizer operations, by requiring the operator to frequently stop and clear the clogs. A careful study of prior coulter assemblies has revealed that a principal problem is the occurrence of "hairpinning" during operation of the units. "Hairpinning" refers to the phenomenon where elongated pieces of straw or other field trash wrap around the coulter blades as they rotate, without being fully cut by the blade, and thus assume a U shape similar to that of hair pin. These hair pin pieces then lodge between the periphery of the coulter blade and the adjacent knife or shoe, which quickly generates clogs.

There is accordingly a need in the art for improved coulter assemblies which are substantially non-clogging during operation, and which particularly overcome the "hairpinning" problem.

SUMMARY OF THE INVENTION

The improved coulter blade assemblies of the invention provide a number of features which in combination largely if not entirely overcome the clogging problems that have plagued prior coulter units. In general, the coulter blade assemblies include support structure having a parallel linkage arm assembly together with an active hydraulic piston and cylinder assembly serving to maintain down-pressure on the coulter blade to maintain blade depth. This in turn ensures that the blade will fully cut straw and other field debris to prevent clogging.

Thus, coulter blade assemblies in accordance with the invention comprise a coulter blade and structure supporting the coulter blade for earth tillage or fertilizer application; the supporting structure includes a parallel linkage arm assembly comprising upper and lower pivotal linkage arms, and an elongated, obliquely oriented piston and cylinder assembly secured to the supporting structure and operable to maintain the coulter blade at a substantially constant depth as the coulter assembly traverses the earth. The overall assemblies also have a knife located adjacent and rearwardly of the coulter blade, along with a covering disk located rearwardly of the coulter blade and knife in order to lose the slit or trench formed by the coulter blade. Finally, an earth-engaging follower gauge wheel is located rearwardly of the covering disk, in order to further assure closure of the slit or trench, and to assist in maintaining proper coulter blade depth during operation. In preferred forms, the coulter blade is essentially vertically oriented and presents opposed, substantially flat faces. This is to be contrasted with prior units having obliquely oriented coulter blades. Additionally, the longitudinal axis of the piston and cylinder assembly is at an angle relative to the longitudinal axes of the upper and lower linkage arms, preferably from about 8-40°.

The upper end of the piston and cylinder assembly is advantageously mounted for pivotal movement about an upper axis substantially coincident with the upper pivot axis of the upper linkage arms, and correspondingly the lower end of the piston and cylinder assembly is mounted for pivotal movement about a lower pivot axis substantially coincident with the lower pivot axis of the lower linkage arms. In order to assure the best operation of the coulter assemblies, the supporting structure should be operable to maintain the coulter blade at a depth of at least about 4 inches during traversal of the earth.

In another embodiment, a knife adjustment assembly is provided allowing for vertical adjustment of the knife between limits, and to adjust the nip distance between the lower end of the knife and the adjacent periphery of the coulter blade. It has been found that maintaining the vertical height of the knife relative to the bottom of the coulter blade between predetermined limits, and also maintaining a close nip distance, materially enhances the operational characteristics of the coulter blade assemblies, and largely prevents clogging thereof during field work.

BRIEF DESCRIPTION OF THE DRAWINGS

FIG. 1 is a rear perspective view of a coulter assembly in accordance with the invention;

FIG. 2 is a side view of the coulter assembly, shown in use with the coulter blade penetrating the earth;

FIG. 6 is an elevational view of another coulter assembly embodiment;

FIG. 7 is a perspective view of the FIG. 6 embodiment;

FIG. 8 is an elevational view of the FIG. 6 coulter assembly in use, with the knife assembly thereof in its lower position;

FIG. 9 is a view similar to that of FIG. 8, but showing the knife assembly in its upper position;

FIG. 10 is a fragmentary, perspective, exploded view of the components of the knife adjustment mechanism of the FIG. 6 embodiment;

FIG. 12A is a greatly enlarged view of the encircled portion of FIG. 12, illustrating the nip distance between the knife and coulter blade.

DETAILED DESCRIPTION OF THE PREFERRED EMBODIMENTS

Embodiment of FIGS. 1-5

Figure 3:
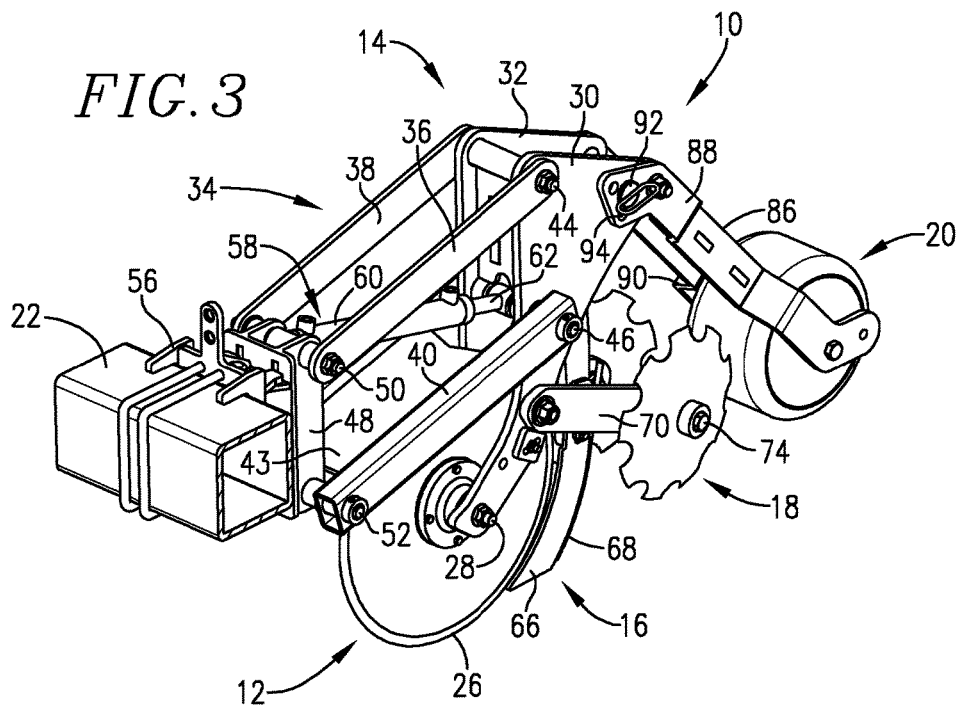
FIG. 3 is a front perspective view of the coulter assembly, illustrated in its uppermost elevated position.

Turning now to the drawings, a coulter blade assembly 10 generally includes an upright, rotatable coulter blade 12, a supporting assembly 14 for the blade 12, a shoe or knife 16 rearward of and in close adjacency to the blade 12, a pair of covering disks 18, and a rearmost gauge wheel 20. The assembly 10 is designed to be secured to a conventional tool bar 22 forming a part of an overall farm implement. In use, a plurality of the coulter assemblies 10 are mounted on tool bar 22 in laterally spaced apart relationship, and as the implement is pulled through a field, the coulter blades 12 and knives 16 penetrate the surface of the earth 24 (FIG. 2) to a desired depth, which is preferably at least about four inches.

In more detail, the blade 12 in the illustrated embodiment is substantially flat and is oriented in an essentially upright fashion. The blade 12 has a sharpened periphery 26 to facilitate formation of a slit or trench in the earth. The blade 12 is mounted for rotation about a trunnion bolt 28.

The supporting assembly 14 includes a pair of laterally spaced apart weldment plates 30 and 32, which support bolt 28 at the lowermost ends thereof. Additionally, a parallel arm linkage assembly 34 forms a part of the assembly 14, and has a pair of laterally spaced upper linkage arms 36, 38 and corresponding lower linkage arms 40, 42; the arms 40, 42 are interconnected by means of a central reinforcing plate 43. The lowermost ends of the linkage arms 36 and 38 are pivotally coupled to the plates 30, 32 by means of a cross bolt 44, whereas the upper ends of the arms 36 and 38 are pivotally mounted to a bracket 48 equipped with a tubular cross shaft receiving a bolt 50. The ends of the lower linkage arms 40, 42 are pivotally mounted to plates 30, 32 and bracket 48 by means of corresponding cross pins 46 and 52. The bracket 48 is supported by an upright pivot tube 54, thereby permitting the assembly 10 to be swung about the vertical axis of the tube 54. Finally, the pivot tube is operatively coupled with a tool bar clamp 56. Thus, the entire assembly 10 is ultimately mounted on tool bar 22.

The overall supporting assembly 14 further has a piston and cylinder assembly 58. In the illustrated embodiment, the upper end of cylinder 60 is pivotally mounted on the upper cross shaft receiving bolt 50, whereas the lower end of piston rod 62 is pivotally secured to the cross pin 46 between the plates 30, 32. As such, it will be observed that the longitudinal axis of assembly 58 is at an angle relative to the longitudinal axes of the upper and lower linkage arms 36-42. This angular relationship changes depending upon the position of assembly 10, but generally the angle ranges from about 8-40°.

The knife 16 has an upper shank 64 secured between the plates 30, 32, and a lower earth-penetrating end 66, which is closely adjacent to the periphery 26 of blade 12. The trailing edge of the knife end 66 is equipped with a delivery tube 68 allowing deposit or injection of seed or fertilizer, e.g., as the assembly 12 traverses the earth.

The covering disks 18 are rotationally mounted on respective legs 70, 72 by bolts 74, 76. The forward ends of the legs 70, 72 are likewise pivotally secured to the plates 30, 32 by 78, 80. A motion-limiting block 82, 84 is affixed to each plate 30, 32, to prevent undue downward movement of the blades 18. The peripheral notches on the blades 18 assist in collecting dirt and depositing the dirt to close the slit or trench formed by the coulter blade 12.

The gauge wheel 20 is secured to the plates 30, 32 by means of an oblique arm 86 made up of side members 88, 90. The orientation of wheel 20 may be altered by means of a cross pin 92 extending through the side members 88, 90 and the plates 30, 32. A series of mating pin holes 94 are provided to allow adjustment of the inclination of arm 86 as desired.

During operation of the assembly 10, the gauge wheel 20 is set to a desired inclination, and the piston and cylinder assembly 58 is actuated to press blade 12 into the earth to a desired depth. As the assembly 10 is pulled through a field, the parallel linkage arm assembly 34 and piston and cylinder assembly 58 serve to effectively maintain the blade 12 at the selected depth, even as the assembly traverses uneven areas of the field. As such, straw and other field trash is cut by the blade 12 and does not "hairpin" around the blade 12; this in turn means that the assembly 10 operates with little or no clogging between the blade 12 and knife 16.

Figure 4:
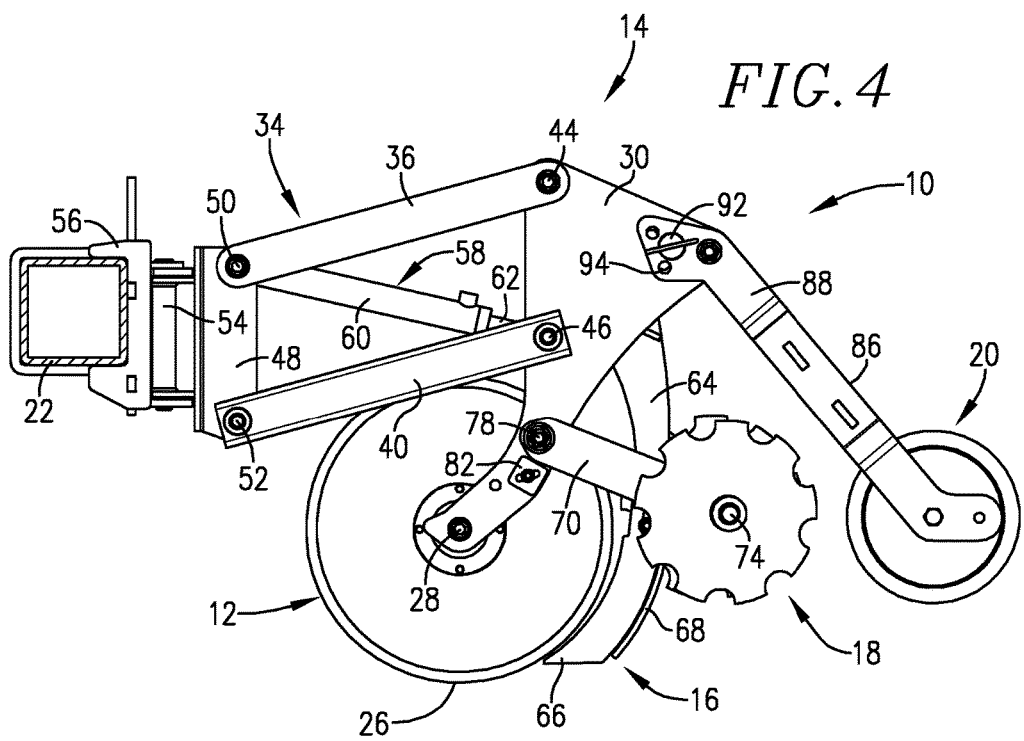
FIG. 4 is a side view of the coulter assembly depicted in FIG. 3.
Figure 5:
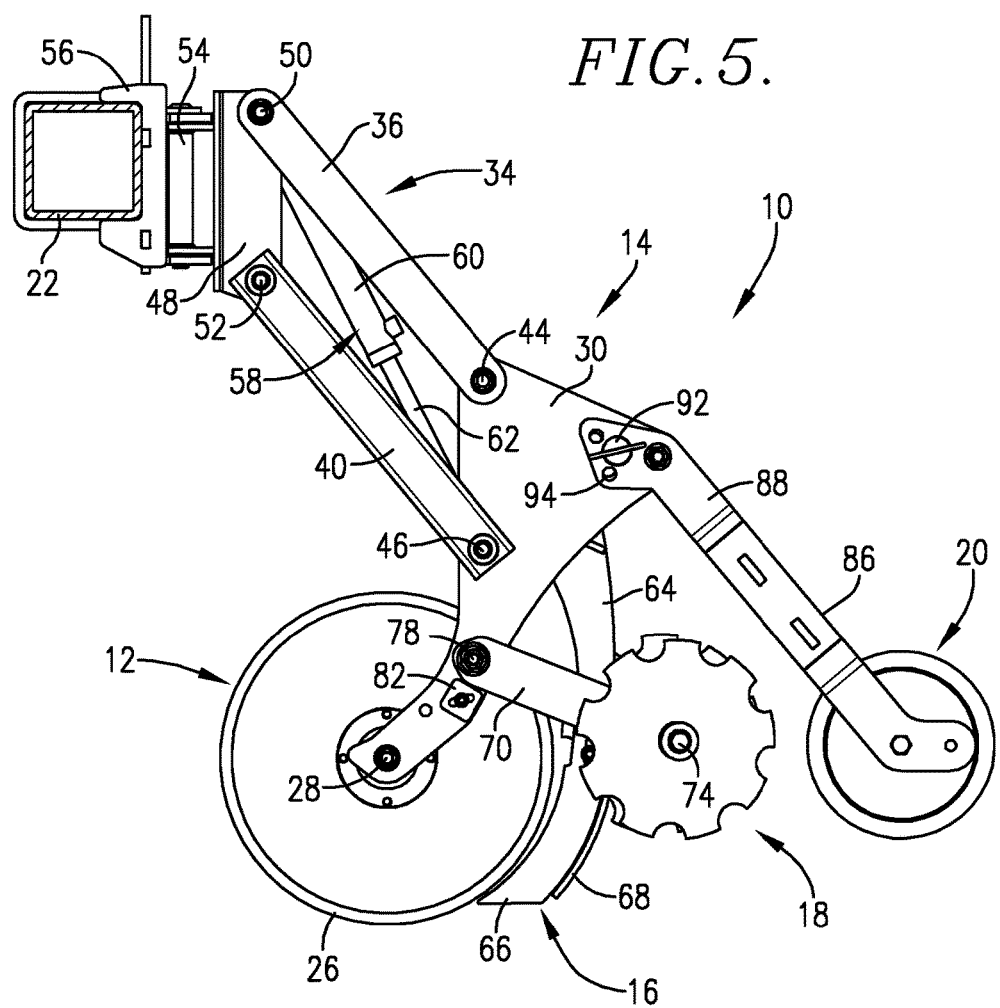
FIG. 5 is a side view of the coulter assembly in its lowermost position.

After field use of the assembly 10, the piston and cylinder assembly 58 is actuated to elevate the assembly 10 above grade, as illustrated in FIGS. 3-4. This allows unrestricted field and road travel of the implement.

Embodiment of FIGS. 6-12A

Turning now to FIGS. 6-9, a coulter blade assembly 110 generally includes an upright, rotatable coulter blade 112, a supporting assembly 114 for the blade 112, a knife 116 rearward of and in close adjacency to the blade 112, a pair of covering disks 118, and a rearmost gauge wheel 120. In addition, the assembly 110 also has a knife adjustment assembly 122 (FIG. 10), which is important for purposes to be described. The assembly 110 is designed to be secured to a conventional tool bar 124 forming a part of an overall farm implement. In use, a plurality of the coulter assemblies 110 are mounted on tool bar 124 in laterally spaced apart relationship, and, as the implement is pulled through the field, the coulter blades 112 and knives 116 penetrate the surface of the earth 126 (FIGS. 8-9) to a desired depth, which is usually at least about four inches.

Figure 11:
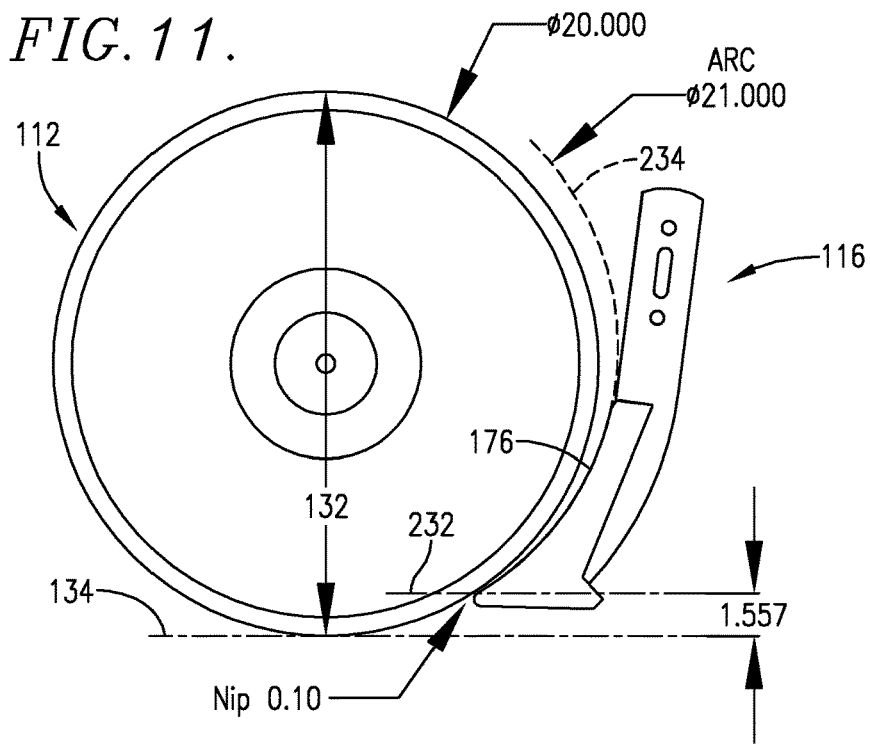
FIG. 11 is a schematic view illustrating certain dimensional relationships of the coulter assembly of FIG. 6, in the lower position of the knife assembly.

In more detail, the coulter blade 112 is substantially flat and is oriented in an essentially upright fashion. The blade 112 has a sharpened periphery 128 to facilitate formation of a slit or trench in the earth. The blade 112 is mounted for rotation about a central trunnion bolt 130. The blade 112 is further defined by a diameter 132 through the center thereof, and also presents a lowermost margin lying in lower plane 134 (FIG. 11).

The supporting assembly 114 includes a pair of laterally spaced apart weldment plates 136, 138, which support a bolt 130 at the lowermost end thereof. Additionally, a parallel linkage arm assembly 140 forms a part of the overall support assembly 114, and has a pair of laterally spaced apart upper linkage arms 142, 144, and corresponding lower linkage arms 146, 148. The arms 146, 148 are interconnected by means of a central reinforcing plate 150. The outer, normally lowermost ends of the upper linkage arms 142, 144 are pivotally coupled to the plates 136, 138 by means of a cross-bolt 152, whereas the inner ends of the arms 142, 144 are pivotally mounted to a bracket 154 equipped with a cross-bolt 158. The inner and outer ends of the lower linkage arms 146, 148 are pivotally mounted to plates 136, 138 and bracket 154 by means of corresponding cross-pins 160, 162. The bracket 154 is supported by an upright pivot tube 164, thereby permitting the assembly 110 to be swung about the vertical axis of the tube 164. Finally, the pivot tube 164 is operatively coupled with a tool bar clamp 166. Thus, the entire assembly 110 is ultimately mounted on the tool bar 124.

The supporting assembly 114 further has a piston and cylinder assembly 168, including conventional cylinder 170 and rod 172. The inner end of cylinder 170 is pivotally mounted on the cross-bolt 158, whereas the outer end of rod 172 is pivotally secured to the cross-pin 162. As such, it will be seen that the longitudinal axis of the assembly 168 is at an angle relative to the longitudinal axis of the upper and lower linkage arms 142-148. This angular relationship changes depending upon the position of assembly 110, but generally the angle ranges from about 8-40°.

The knife 116 has an upper shank 174, an inner arcuate margin 176 extending below the shank 174, a lower rounded nip section 178, and a lowermost edge 180. The shank 174 is provided with upper and lower mounting apertures 182 and 184, together with a slot 186 between the apertures 182, 184. The trailing edge of the knife 116 is equipped with a delivery tubes 188, 189, allowing for deposit or injection of solid or liquid fertilizer as the assembly 110 traverses the earth.

The covering disks 118 are rotationally mounted on respective legs 190, 192 by bolts 194, 196. The forward ends of the legs 190, 192 are likewise pivotally secured to the plates 136, 138 by bolts 198. The peripheral notches on the disks 118 assist in collecting dirt and depositing the dirt to close the slit or trench formed by the coulter blade 112.

The gauge wheel 120 is pivotally secured to the plates 136, 138 by means of oblique arms 200, 202 and bolts 204. The orientation of wheel 120 may be altered by means of a cross-pin 206 extending through the arms 200, 202. A series of mating pin holes 208 are provided to allow adjustment of the inclination of the arms 200, 202 as desired.

The knife adjustment assembly 122 (FIG. 10) includes a mounting plate 210 pivotally secured between the weldment plates 136, 138 by means of a tubular shaft 212 and bolt 214. The upper end of the mounting plate 210 has a vertical surface 216 as shown, whereas the lower end thereof is equipped with a pair of vertically spaced apart apertures 218 and 220. A cross-plate 222 is fixedly secured between the weldment plates 136, 138 and is equipped with a tilt adjustment bolt 224, which serves as an adjustable abutment for the plate 210.

The shank 174 of knife 116 is secured to the lower end of mounting plate 210 by means of upper and lower bolts 226 and 228. In the lowermost position of knife 116 depicted in FIG. 8, the upper bolt 226 passes through the apertures 182 and 218, whereas the lower bolt 228 passes through the bottom of slot 186 and aperture 220. In the uppermost position of knife 116 depicted in FIG. 9, the upper bolt 226 passes through the upper end of slot 186 and aperture 218, while the lower bolt 228 passes through the apertures 184 and 220. Of course, further intermediate knife positions between the upper and lower positions can be provided by means of extra, strategically located apertures or slots through the shank 174.

It has been determined that the position of knife 116 relative to coulter blade 112 is important in maintaining smooth, trouble-free operation of the assembly 110. This is particularly important in assuring that the assembly 110 avoids the field trash clogging problems of conventional coulter assemblies, and the "hairpinning" issues leading to the clogging.

The preferred aspects of the positioning of knife 116 are best illustrated in FIGS. 10, 11, 12, and 12A. Considering first FIG. 12A, it will be observed that the nip section 178 is located closely adjacent to the periphery 128 of blade 112. The closest distance between section 178 and periphery 128 is considered to be the "horizontal nip distance" 230, and this distance lies in a horizontal plane 232. Advantageously, the horizontal nip distance should range from about 0.05-0.25 inches; in the illustrated embodiment, the nip distance is 0.10 inches.

Figure 12:
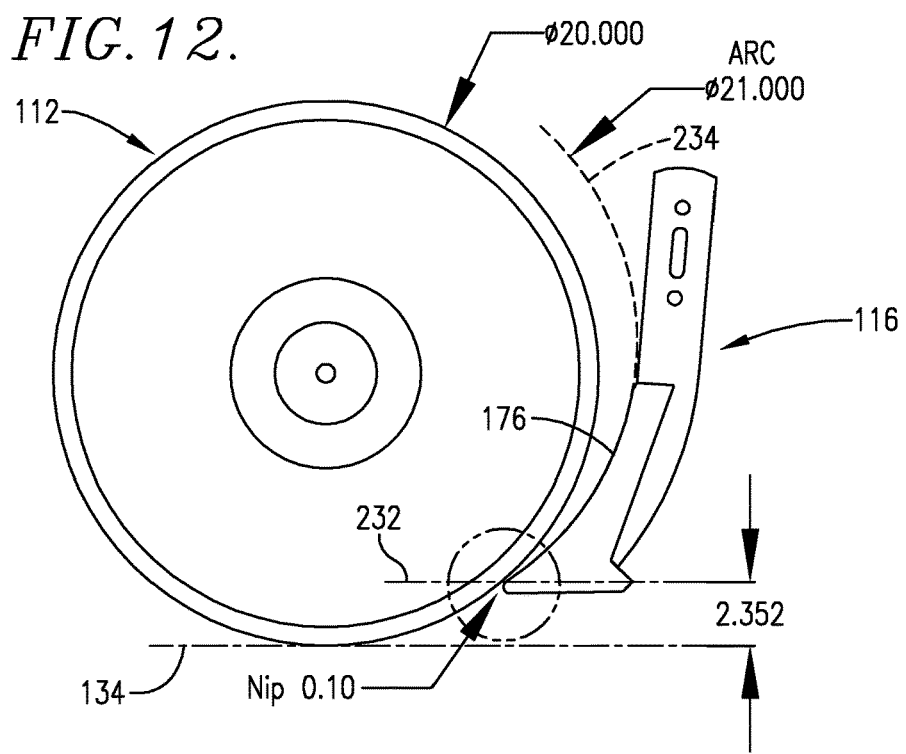
FIG. 12 is a schematic view similar to that of FIG. 11, but showing the knife assembly in its upper position.

Additionally, the knife 116 should be vertically adjusted to maintain a desired vertical distance between the planes 232 and 134. As depicted in FIGS. 11 and 12, this distance ranges from about 1.6 to 2.4 inches in the case where the coulter blade 112 has a diameter 132 of 20 inches. More generally, this vertical distance should be from about 5 to 15% of the diameter 132 of the coulter blade 112. Thus, in the illustrated embodiment, at the lowermost position of knife 116, the vertical distance between the planes 232 and 134 is 1.6/20×100=8%, while, at the lowermost position of the knife, the vertical distance is 2.4/20×100=12%.

The arcuate margin 176 of the knife 116 between the shank 174 and nip section 178 preferably lies in an arc 234 relative to the center line of the coulter blade 112 (see FIGS. 11-12). Preferably, the arc 234 is greater than the diameter of the coulter blade 132 by a factor of at least about 4%. In the illustrated embodiment, the arc 234 is 21 inches, compared with the 20 inch diameter of the coulter blade 112. Thus, the arc 234 is 1/20×100=5% greater than the diameter 132.

It will be readily appreciated that the orientation of knife 116 can be adjusted by means of the tilt adjustment bolt 224 bearing upon surface 216, and by the positioning bolts 226 and 228, in order to meet the desired criteria. Thus, the knife 116 would typically be initially adjusted vertically using the bolts 226 and 228, whereupon the nip distance would be adjusted using the tilt adjustment bolt 224. The latter adjustment can also be made independently of any vertical adjustment of the knife 116, such as may be required owing to wear of the coulter blade 112. Once the knife adjustments are made, the assembly 110 is operated as set forth in connection with the assembly 10 of the first embodiment.

I claim:

1. A coulter assembly comprising:
   a coulter blade presenting a diameter and a lower margin;
   structure supporting said coulter blade, including a parallel linkage arm assembly comprising upper and lower pivotal linkage arms, and an elongated, obliquely oriented piston and cylinder assembly secured to said supporting structure and operable to maintain the coulter blade at a substantially constant depth as the coulter assembly traverses the earth;
   a knife located adjacent and rearwardly of said coulter blade and oriented to present a horizontal nip at a lower portion of the knife, with a nip distance between said lower knife portion and the adjacent edge of said coulter blade; and
   an adjustment assembly supporting said knife and including structure for selectively adjusting the height of said knife relative to said lower margin of said coulter blade between an upper and a lower position, said lower position being at a level where said nip is a distance above said coulter blade lower margin equal to about 5% of said coulter blade diameter, said upper position being at a level where said nip is a distance above said coulter blade lower margin equal to about 15% of said coulter diameter.

2. The assembly of claim 1, said adjustment assembly including structure for selectively tilting said knife relative to said coulter blade in order to maintain said horizontal nip distance between about 0.05-0.25 inches.

3. The assembly of claim 2, said tilting structure including an adjustable abutment located adjacent the upper end of said knife and in abutment therewith.

4. The assembly of claim 1, said knife presenting an arcuate inner margin extending upwardly from said nip, said inner margin lying along an arc relative to the center of said coulter blade, said arc being greater than the diameter of the coulter blade.

5. The assembly of claim 4, said arc being at least about 4% greater than the diameter of the coulter blade.

6. The assembly of claim 1, including a covering disk rotated rearwardly of said coulter blade and knife, and an earth-engaging follower gauge wheel located rearwardly of said covering disk.

7. The assembly of claim 1, said coulter blade being essentially vertically oriented.

8. The assembly of claim 1, the longitudinal axis of said piston and cylinder assembly being at an angle relative to the longitudinal axes of said upper and lower linkage arms.

9. The assembly of claim 8, said angle being from about 8-40°.

10. The assembly of claim 1, there being an upper pivot pin pivotally supporting the upper end of the upper linkage arm, and a lower pivot pin pivotally supporting the lower end of said lower linkage arm, one end of said piston and cylinder assembly being pivotally secured to said supporting structure about an axis coincident with the axis of said upper pivot pin, the other end of said piston and cylinder assembly being pivotally secured to said support structure about an axis coincident with the axis of said lower pivot pin.

11. The assembly of claim 1, said parallel linkage arm assembly comprising a pair of laterally spaced apart upper linkage arms, and a pair of laterally spaced apart lower linkage arms.

12. The assembly of claim 1, said supporting structure including a clamp operable to be secured to an implement tool bar, and an upright pivot member located between said clamp and said parallel linkage arm assembly.

13. The assembly of claim 1, said covering disk being peripherally notched.

14. The assembly of claim 1, there being a pair of laterally spaced apart covering disks respectively located proximal to the adjacent faces of said coulter blade.

15. The assembly of claim 1, said supporting structure including a mounting plate pivotally supporting said coulter blade, said upper and lower linkage arms pivotally coupled with said plate above said coulter blade.

16. The assembly of claim 1, said supporting structure operable to maintain said coulter blade at a depth of at least about 4 inches during said traversal of the earth.

* * * * *